Nov. 14, 1961    L. W. ADAMS    3,008,801
PRODUCTION OF AQUA AMMONIA AND AMMONIUM PHOSPHATE
Filed June 12, 1957
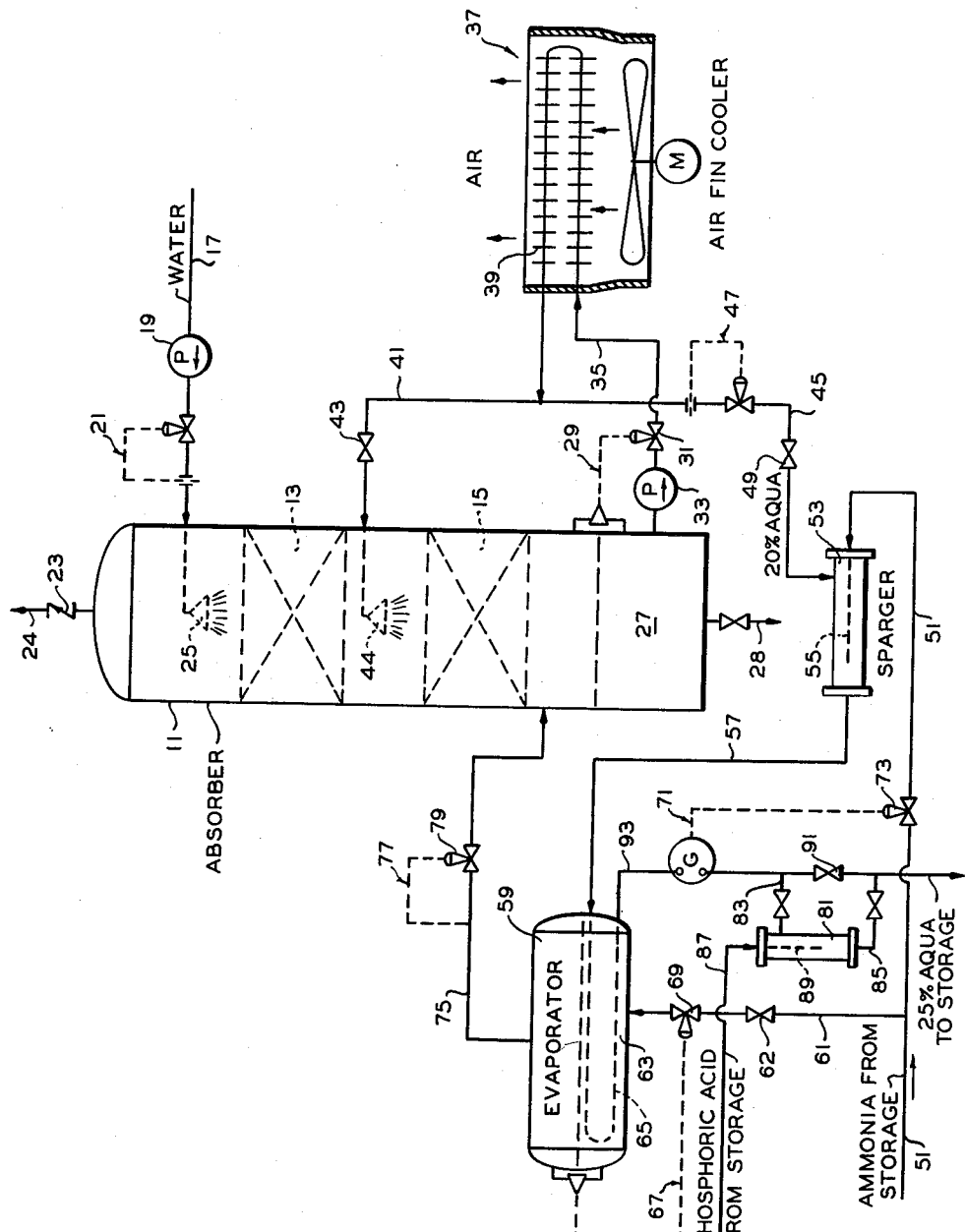
INVENTOR.
L. W. ADAMS
BY
ATTORNEYS

# United States Patent Office 3,008,801
Patented Nov. 14, 1961

3,008,801
PRODUCTION OF AQUA AMMONIA AND
AMMONIUM PHOSPHATE
Loyd W. Adams, Bartlesville, Okla., assignor to Phillips
Petroleum Company, a corporation of Delaware
Filed June 12, 1957, Ser. No. 665,259
4 Claims. (Cl. 23—107)

This invention relates to production of liquid fertilizer. In one aspect it relates to a method and apparatus for the control of exothermic heat of solution in the production of aqueous ammonia from liquid or anhydrous ammonia and water. In another aspect it relates to method and apparatus for the production of high concentration aqueous ammonia at relatively low pressures and to the production of aqueous ammonium phosphate.

By the term liquid ammonia as used throughout this specification and claims is meant anhydrous or substantially anhydrous ammonia. Anhydrous or liquid ammonia is produced in large volumes for fertilizer purposes. Much of the fertilizer ammonia is used in areas far removed from points of manufacture and transportation becomes an important item. It is preferable to ship the ammonia in its original liquid or anhydrous form and to produce the aqua ammonia for use as a fertilizer at a point at least near the area in which it is to be used.

An object of this invention is to provide a method and apparatus for the production of aqua ammonia from liquid or anhydrous ammonia.

Another object of this invention is to provide a method and apparatus for the production of aqua ammonia having a high concentration of ammonia at a pressure sufficiently low that use of high pressure expensive absorption vessels is not required.

It is well known that solution of liquid or anhydrous ammonia in water is highly exothermic and upon addition of large amounts of liquid ammonia to water, temperatures of the resulting aqueous solutions become quite high. In order to obtain reasonably high concentrations of ammonia in the aqueous solution, it becomes necessary to carry out the absorption operation under superatmospheric pressures. It is also known that vessels suitable for use in high pressure processing are expensive.

Bearing these points in mind I have devised a process for the production of aqueous ammonia of high concentration wherein high pressure absorption vessels are not required. Thus, vessels which are suitable for use in my process are relatively inexpensive vessels.

According to my invention I have devised a process for producing cool concentrated aqueous ammonia comprising injecting liquid ammonia into a dilute solution of aqueous ammonia thereby producing a hot concentrated aqueous ammonia solution, cooling this hot concentrated aqueous ammonia solution by indirect heat exchange with vaporizing liquid ammonia thereby producing a cool concentrated aqueous ammonia as the product of the operation.

Furthermore, my process is suitable for producing a concentrated ammonia solution from liquid ammonia and water comprising vaporizing the liquid ammonia, absorbing the ammonia vapors in water thereby producing a hot dilute aqua ammonia, cooling the heated dilute aqua ammonia by indirect heat exchange with the atmosphere, dividing the cooled dilute aqua ammonia into two portions, returning one portion to the absorption step as at least a portion of the absorbent water, injecting additional liquid ammonia into the other portion of the cooled dilute aqua ammonia thereby producing a hot concentrated solution of aqua ammonia, passing this hot concentrated solution of aqua ammonia in indirect heat exchange with the above-mentioned vaporizing liquid ammonia thereby providing latent heat for the vaporizing step and simultaneously cooling the hot concentrated solution of aqua ammonia, and withdrawing the cooled concentrated solution of aqua ammonia as the product of the operation.

The drawing illustrates an arrangement of apparatus parts suitable for carrying out the process of my invention.

In describing the apparatus I will illustrate the process by giving materials, their quantities, and temperatures and pressures at various points in the system.

Referring now to the drawing, and as an example 8,240 pounds of liquid or anhydrous ammonia per hour from a storage vessel, not shown, is passed through pipe 51 and a portion of this ammonia is by-passed from pipe 51 through a pipe 61 provided with a valve 62 and a motor valve 69 and is introduced into an evaporator vessel or tank 59. In this evaporator tank 59 the ammonia is heated by indirect heat exchange with a subsequently described material, which passes through a heat exchange coil 65 in the tank. Sufficient heat is provided for evaporation of the ammonia at about 140° F. and pressure of about 250 p.s.i.g. (pounds per square inch gage). Vaporous ammonia at this temperature and pressure is passed through a pipe 75 provided with a back pressure regulator 77 which maintains the abovementioned pressure in the evaporator 59. Upon passing through motor valve 79 of the regulator the ammonia vapors enter an absorber 11 at about the elevation illustrated in the drawing. This absorber vessel 11 is provided with a body of packing material 15. This packing material is preferably such a material as Raschig rings. However, other suitable packing material such as broken bricks, saddles, or the like can be used. Above this bed of packing material is disposed a spray nozzle 44 as illustrated. Above spray nozzle 44 is a second bed of similar packing material 13. At an elevation above packing 13 is a second spray nozzle 25. A pipe 24, containing a relief valve 23 is provided in case pressure relief is necessary. A pipe 17 conducts water, for example, 49 gallons per minute, from a source not shown, under the influence of a pump 19 into the vessel 11 through spray nozzle 25. A rate of flow controller apparatus 21 is provided in pipe 17 at the location illustrated for regulation of the rate of flow of the fresh water to the absorber 11. Vaporous ammonia from pipe 75 rises through packing 15 and packing 13, and is absorbed by the water from spray nozzle 25. Since solution or absorption of gaseous ammonia in water is exothermic, the temperature of the aqueous ammonia 27 is about 200° F. when sufficient ammonia is absorbed to yield a 20 percent ammonia solution. This 20 percent concentration of ammonia is easily obtained at a pressure of about 150 p.s.i.g. within the absorber 11.

Aqueous ammonia at 200° F. is withdrawn through a pipe 35 under the influence of a pump 33 and is passed through an air fin heat exchanger apparatus 37. The rate of withdrawal of this hot, aqueous ammonia is controlled by a liquid level controller apparatus 29 which actuates motor valve 31 in pipe 35. The aqueous ammonia entering cooler 37 is approximately 150 g.p.m. (gallons per minute) at a temperature of 200° F. The air fin cooler 37, which is driven by a 7.5 horsepower motor, removes 2,650,000 B.t.u. per hour by indirect heat exchange with the atmosphere. The removal of this quantity of heat reduces the temperature of the 150 gallons per minute of aqueous ammonia from 200° F. to about 160° F. The cooled aqueous ammonia is divided into two portions, one portion is passed through a pipe 41 and through a valve 43 and is introduced into the absorber 11 through spray nozzle 44. The introduction of this cooled aqueous ammonia into an absorber at this point assists in further absorption of ammonia vapor and after such cyclic operation has continued for some time, the aqueous ammonia 27 reaches a temperature of 200° F. and 20 percent concentration as mentioned above.

The air fin exchanger unit is identified by reference numeral 39.

The second portion of the cooled aqueous ammonia from the air fin cooler is passed through a pipe 45 into a sparger 53. Pipe 45 is provided with a rate of flow controller apparatus 47 for control of the rate of flow of the cooled aqueous ammonia into the sparger. A valve 49 is provided in pipe 45 in case it is ever desired to close this portion of the apparatus for any reason whatever.

As mentioned above, a portion of the liquid ammonia entering the system is by-passed from pipe 51 through pipe 61 into the evaporator 59, the remainder of liquid ammonia is then passed on through a motor valve 73 and enters the sparger 53 through a sparge tube 55. This sparge tube is, if desired, made of a corrosion resistant material and contains small diameter openings through which liquid ammonia is ejected at a high velocity into the 20 percent aqua ammonia entering the sparger through pipe 45. These openings are in some cases made by ⅛ to ¼ inch drills. From 10 to 50 such openings are made in sparge tube 55 depending on the rate of anhydrous ammonia injection desired. The openings should, preferably, be arranged at spaced intervals in the surface of the sparge tube for thorough dissolving of the liquid ammonia in the aqueous ammonia. In this manner the liquid ammonia is thoroughly mixed with the aqueous ammonia in the sparger. The temperature of the high concentration aqueous ammonia leaving the sparger through a pipe 57 is considerably higher than the 160° F. temperature of the 20 percent aqueous ammonia entering the sparger. Since ammonia is easily lost by evaporation from aqueous ammonia, it is preferable to cool the high concentration aqueous ammonia leaving the sparger through pipe 57. The hot high concentration ammonia is then passed through the heat exchange coil 65 in evaporator 59 in indirect heat exchange with liquid or anhydrous ammonia 63. The vaporizing ammonia markedly cools this high concentration aqueous ammonia and, in fact, the aqueous ammonia is withdrawn from the heat exchange coil 65 through a pipe 93 at a temperature of about 65° F. In order to make certain that the heat exchange coil 65 is always completely covered with liquid ammonia, I provide a liquid level controller assembly 67 which operates a motor valve 69 in pipe 61 for regulation of the flow of liquid ammonia into the evaporator.

I find that a gravitometer control apparatus 71, which is responsive to the specific gravity of the aqueous ammonia flowing through pipe 93, easily actuates motor valve 73 for the control of the flow of liquid ammonia into the sparger 53. As is well known, aqueous ammonia has a specific gravity less than that of water and, accordingly, the higher the concentration of ammonia in the aqueous solution, the lower is its specific gravity. Since in the example set forth herein I have described the operation of producing an aqueous ammonia solution containing about 25 percent of ammonia by weight, such a solution has a specific gravity of about 0.91. Thus, upon setting the gravitometer to operate at a specific gravity of 0.91, that is, if the specific gravity is less than 0.91, the gravitometer is constructed to throttle motor valve 73 so that less ammonia enters the sparger. Conversely, if the ammonia flowing through pipe 93 has a specific gravity greater than 0.91, the gravitometer apparatus opens motor valve 73 somewhat to allow a larger volume of liquid ammonia to enter the sparger and thus increase the concentration of the ammonia.

My apparatus herein described can, with small modification, be adapted to the production of an aqueous solution of ammonium phosphate which is also used for fertilizer purposes. This alteration of equipment comprises providing a valve 91 in pipe 93 and providing a second sparger vessel 81 by-passing valve 91. Pipes 83 and 85 connect this second sparger to pipe 93 around valve 91. Valves are provided in pipes 83 and 85 in case this second sparger is not in use. Sparger 81 is provided with a sparge tube 89 for injection of the phosphoric acid. A pipe 87 conducts the phosphoric acid, from a source not shown, to the sparge tube 89 for injection into the aqueous ammonia from pipe 93. As illustrated in the drawing, sparger 81 is installed at a point downstream of gravitometer 71. This sparger is located at this point so that the gravitometer apparatus 71 will regulate the concentration of the ammonia in the aqueous ammonia prior to the addition of the phosphoric acid. Any desired means of regulation of the rate of addition of phosphoric acid can be used. For example, a second gravitometer apparatus similar to gravitometer 71 is, if desired, installed in pipe 93 downstream of the point of juncture of pipe 85 with pipe 93 and the rate of inlet of phosphoric acid thus regulated.

Pipe 28 is provided in the bottom of absorber vessel 11 in case drainage from the bottom of the vessel is ever required.

While I have described my invention relative to the production of aqueous ammonia of 25 percent concentration, it is realized that aqueous ammonia of any other desired concentration can be produced; for example, 20 percent concentration ammonia can be produced. For the production of this lower concentration ammonia the pressure in the absorber is maintained at a value below the herein disclosed pressure of 150 p.s.i.g., for example, 100 p.s.i.g. However, at this lower pressure the temperature of the lake of aqueous ammonia 27 is lower than the above mentioned 200° F. and, accordingly, the heat exchange load on the air fin cooler is less.

One of the main advantages or utility of the used of the air fin cooler in cooling the aqueous ammonia is that in areas of high humidity wherein conventional water cooling towers are relatively inefficient, such a cooler as an air fin cooler is relatively efficient. As is well known, the specific heat of humid air is higher than the specific heat of dry air; thus, in moist atmospheres the production of aqueous ammonia with an air fin cooler has a marked advantage over the use of a conventional cooling tower. However, if desired, a conventional cooling tower can be used in place of the air fin cooler or in conjunction with the air fin cooler.

While I have disclosed use of several liquid level controllers, rate of flow controllers and back pressure regulators and some manually operable valves, other auxiliary apparatus, such as valves, pressure and temperature indicating and recording equipment, can be used at such points in the system as desired. For example, it would be convenient and informative to provide a recording flow controller in pipe 75 and in pipe 51 just prior to sparger 53 in order to provide records of the rates of flow of materials at these points.

While certain embodiments of the invention have been described for illustrative purposes, the invention obviously is not limited thereto.

I claim:

1. A process for producing a concentrated aqua ammonia solution from liquid ammonia and water comprising the steps of vaporizing said liquid ammonia, absorbing the so-produced ammonia vapors in water thereby producing a heated dilute aqua ammonia, cooling the heated dilute aqua ammonia by indirect heat exchange, dividing the cooled dilute aqua ammonia into two portions, returning one portion to the absorption step as at least a portion of the absorbent water, separately injecting additional liquid ammonia into the other portion of the cooled dilute aqua ammonia thereby producing a hot concentrated aqua ammonia, passing this hot concentrated aqua ammonia in indirect heat exchange with the above-mentioned vaporizing liquid ammonia thereby providing latent heat for the vaporizing step and simultaneously cooling the hot concentrated solution of aqua ammonia, and withdrawing the cooled concentrated aqua ammonia as the product of the operation.

2. A process for producing a concentrated aqua ammonia solution from liquid ammonia and water comprising the steps of vaporizing said liquid ammonia, absorbing the so-produced ammonia vapors in water thereby producting a heated dilute aqua ammonia, cooling the heated dilute aqua ammonia by indirect heat exchange with the atmosphere, dividing the cooled dilute aqua ammonia into two portions, returning one portion to the absorption step as at least a portion of the absorbent water, separately injecting additional liquid ammonia into the other portion of the cooled dilute aqua ammonia thereby producing a hot concentrated aqua ammonia, passing this hot concentrated aqua ammonia in indirect heat exchange with the above-mentioned vaporizing liquid ammonia thereby providing latent heat for the vaporizing step and simultaneously cooling the hot concentrated aqua ammonia, and withdrawing the cooled concentrated aqua ammonia as the product of the operation.

3. A process for producing an aqueous ammonium phosphate solution from liquid ammonia, phosphoric acid and water comprising the steps of vaporizing said liquid ammonia, absorbing the so-produced vaporous ammonia in water thereby producing a warmed dilute aqua ammonia, cooling the warmed dilute aqua ammonia by indirect heat exchange, dividing the cooled dilute aqua ammonia into two portions, returning one portion to the absorption step as at least a portion of the absorbent water, separately injecting additional liquid ammonia into the other portion of the cooled dilute aqua ammonia thereby producing a heated concentrated aqua ammonia, cooling this heated concentrated aqua ammonia by passing same in indirect heat exchange with the above mentioned vaporizing liquid ammonia whereby latent heat is provided and the heated concentrated aqua ammonia is simultaneously cooled, injecting phosphoric acid into the cooled concentrated aqua ammonia thereby producing aqueous ammonium phosphate, and removing this aqueous ammonium phosphate as the product of the operation.

4. A process for producing an aqueous ammonium phosphate solution from liquid ammonia, phosphoric acid and water comprising the steps of vaporizing said liquid ammonia, absorbing the so-produced vaporous ammonia in water thereby producing a warmed dilute aqua ammonia, cooling the warmed dilute aqua ammonia by indirect heat exchange with the atmosphere, dividing the cooled dilute aqua ammonia into two portions, returning one portion to the absorption step as at least a portion of the absorbent water, separately injecting additional liquid ammonia into the other portion of the cooled dilute aqua ammonia thereby producing a heated concentrated aqua ammonia, cooling this heated concentrated aqua ammonia by passing same in indirect heat exchange with the above mentioned vaporizing liquid ammonia whereby latent heat is provided and the heated concentrated aqua ammonia is simultaneously cooled, injecting phosphoric acid into the cooled concentrated aqua ammonia thereby producing aqueous ammonium phosphate, and removing this aqueous ammonium phosphate as the product of the operation.

References Cited in the file of this patent

UNITED STATES PATENTS

| | | |
|---|---|---|
| 328,066 | Ritter et al. | Oct. 13, 1885 |
| 1,885,012 | Harvey | Oct. 25, 1932 |
| 2,585,638 | Drew | Feb. 12, 1952 |
| 2,701,182 | Sellers et al. | Feb. 1, 1955 |
| 2,792,286 | Wordie et al. | May 14, 1957 |
| 2,799,569 | Wordie et al. | July 16, 1957 |
| 2,825,630 | Berger | Mar. 4, 1958 |
| 2,855,278 | Adams et al. | Oct. 7, 1958 |
| 2,890,937 | Bresee | June 16, 1959 |